United States Patent [19]

Vulih et al.

[11] Patent Number: 5,717,736

[45] Date of Patent: Feb. 10, 1998

[54] TESTING CIRCUIT AND METHOD FOR A CODEC HYBRID BALANCE NETWORK

[75] Inventors: Salomon Vulih, Neshanic; Thomas David Housten, Somerville, both of N.J.

[73] Assignee: Harris Corporation, Melbourne, Fla.

[21] Appl. No.: 552,379

[22] Filed: Nov. 3, 1995

[51] Int. Cl.⁶ .......................... H04M 1/24; H04M 3/08; H04M 3/22

[52] U.S. Cl. ...................... 379/3; 379/6; 379/10; 379/21; 370/252; 375/224

[58] Field of Search .................. 379/1, 3–4, 12–13, 379/27, 399, 401, 406, 413, 6, 7, 21, 22, 19, 29, 31, 35; 375/224–228, 238–239, 222; 370/241, 242, 252; 455/67.1, 115

[56] References Cited

U.S. PATENT DOCUMENTS

| | | |
|---|---|---|
| 4,860,332 | 8/1989 | Chism ........................... 379/1 |
| 4,870,675 | 9/1989 | Fuller et al. ................... 379/6 |
| 5,003,554 | 3/1991 | Chism ........................... 379/10 |
| 5,048,054 | 9/1991 | Eyuboglu et al. ............. 375/222 |
| 5,111,497 | 5/1992 | Bliven et al. ................. 379/27 |
| 5,253,291 | 10/1993 | Naseer et al. ................ 379/406 |
| 5,289,459 | 2/1994 | Brownlie ....................... 370/252 |
| 5,341,417 | 8/1994 | Hwang et al. ................. 379/399 |
| 5,473,666 | 12/1995 | Szezebak, Jr. et al. ....... 379/3 |
| 5,475,731 | 12/1995 | Rasmusson .................... 379/3 |

*Primary Examiner*—Curtis Kuntz
*Assistant Examiner*—Binh K. Tieu
*Attorney, Agent, or Firm*—Rogers & Killeen

[57] ABSTRACT

A telephone system coder/decoder (CODEC) having improved access for testing CODEC components and a method of testing a CODEC in which a test signal is not contaminated by passage through CODEC filters. Input test pads are positioned between the receive channel filters and the connection of the receive channel to the hybrid balance network, and an output test pad is positioned between the transmit channel filters and the connection of the transmit channel to the hybrid balance network. Test signals selectively applied to the test pads or to CODEC terminals indicate operation of receive programmable gain section, hybrid balance network frequency response, hybrid balance network echo cancellation, and the transmit buffer, buffer splitter and transmit programmable gain section in the transmit channel. The test signals do not go through the transmit and receive filters.

22 Claims, 3 Drawing Sheets

TESTING CIRCUIT AND METHOD FOR A CODEC HYBRID BALANCE NETWORK

BACKGROUND OF THE INVENTION

The present invention is directed to a telephone system coder/decoder (CODEC), and more particularly to an improved CODEC with better access for testing CODEC components and a method of testing a CODEC in which a test signal is not contaminated by passage through CODEC filters.

Telephone systems include a CODEC connected between a subscriber line interface circuit (SLIC) and a telephone central office. The CODEC has a transmit channel for converting an audio signal to a digital signal and a receive channel for converting a digital signal to an audio signal. The transmit channel receives an outgoing audio signal from the SLIC and provides a digital signal to the telephone central office, and the receive channel receives a digital signal from the central office and provides an audio signal to the SLIC.

With reference to FIG. 1, a CODEC 10 typically includes a transmit channel 12 with a pair of transmit lines 14 along which are serially connected transmit filters 16 (e.g., switched capacitor high pass filter 18, switched capacitor low pass filter 20, and anti-aliasing filter 22), a transmit programmable gain section 24, a buffer 25, a buffer/splitter 26, and a connection 28 to a SLIC. Transmit channel 12 provides the outgoing signal to an analog-to-digital converter 30 for transmission to the telephone central office.

CODEC 10 also typically includes a receive channel 32 with a pair of receive lines 34 along which are serially connected a set of transmit filters 36 (e.g., a switched capacitor low pass filter 38, and smoothing filter 40), a sample and hold buffer 42, a receive programmable gain section 44, a differential to single-ended converter 46, and a connection 48 to a SLIC. Receive channel 32 receives the incoming signal from digital-to-analog converter 50 from the telephone central office. Both receive channel 32 and transmit channel 12 may be in a single integrated circuit in CODEC 10.

One of the problems encountered in telephone communications is that part of the received audio signal is fed into the transmit channel as an echo. The echo may be cancelled by using a circuit commonly referred to as a hybrid balance network. The hybrid balance network creates an echo cancellation signal that has the same frequency and phase relationship as the echo, but is 180° out of phase. The echo cancellation signal is fed into the transmit channel to cancel the echo.

With reference again to FIG. 1, a hybrid balance network 60 typically includes one or more hybrid balance switched capacitor filters 62 and a hybrid balance gain adjustment section 64. Hybrid-balance network 60 taps one of the receive lines 34 at connection 66 and provides the echo cancellation signal to buffer/splitter 26 where it is combined with the audio signal from the SLIC. Hybrid balance network 60 may be in an integrated circuit with transmit channel 12 and receive channel 32, or may be provided in an external circuit.

The manufacture and maintenance of CODECs includes tests of frequency and phase responses and echo cancellation effectiveness of the hybrid balance network 60 and tests of other CODEC components, such as the programmable gain sections 24 and 44. These tests are difficult and time consuming, and it is desirable to reduce both the difficulty and time of the tests. For example, hybrid balance network 60 is tested conventionally by providing a test signal to D/A Converter 50, through receive filters 36, hybrid balance network 60 and transmit filters 16 to A/D converter 30. Thus, the test signal must travel the entire path through CODEC 10. As will be appreciated by those of skill in the art, the passage of the test signal through transmit filters 36 and receive filters 16 may distort the frequency and phase response of the test signal. The difficulty in providing a test signal unaffected by the filters has directly effected the difficulty and time of the tests of CODEC components.

Accordingly, it is an object of the present invention to provide a novel method and CODEC in which the difficulty and time of CODEC testing are reduced, thereby obviating the problems of the prior art.

It is another object of the present invention to provide a novel CODEC and method of testing the CODEC in which test pads for applying and sensing a test signal are provided in the CODEC circuitry at locations selected so as to avoid test signal contamination by the filters in the transmit and receive channels of the CODEC.

It is yet another object of the present invention to provide a novel CODEC and method of testing the CODEC in which a test signal is applied to the receive channel of the CODEC between the receive channel filters and the connection of the receive channel to the hybrid balance network so as to avoid contamination by the filters.

It is a further object of the present invention to provide a novel CODEC and method of testing the CODEC in which a flat frequency test signal is applied to an input test pad in the receive channel of the CODEC between the receive channel filters and the receive channel programmable gain section, routed through the hybrid balance network, and sensed at an output test pad in the transmit channel between the transmit channel filters and the transmit channel programmable gain section, thereby avoiding test signal passage through the transmit and receive filters.

It is still a further object of the present invention to provide a novel CODEC and method of testing the CODEC in which test signals are selectively applied to test pads and existing CODEC terminals to independently test the receive channel programmable gain section, the hybrid balance network frequency response, the hybrid balance network echo cancellation, and the transmit buffer, buffer splitter and programmable gain section in the transmit channel.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
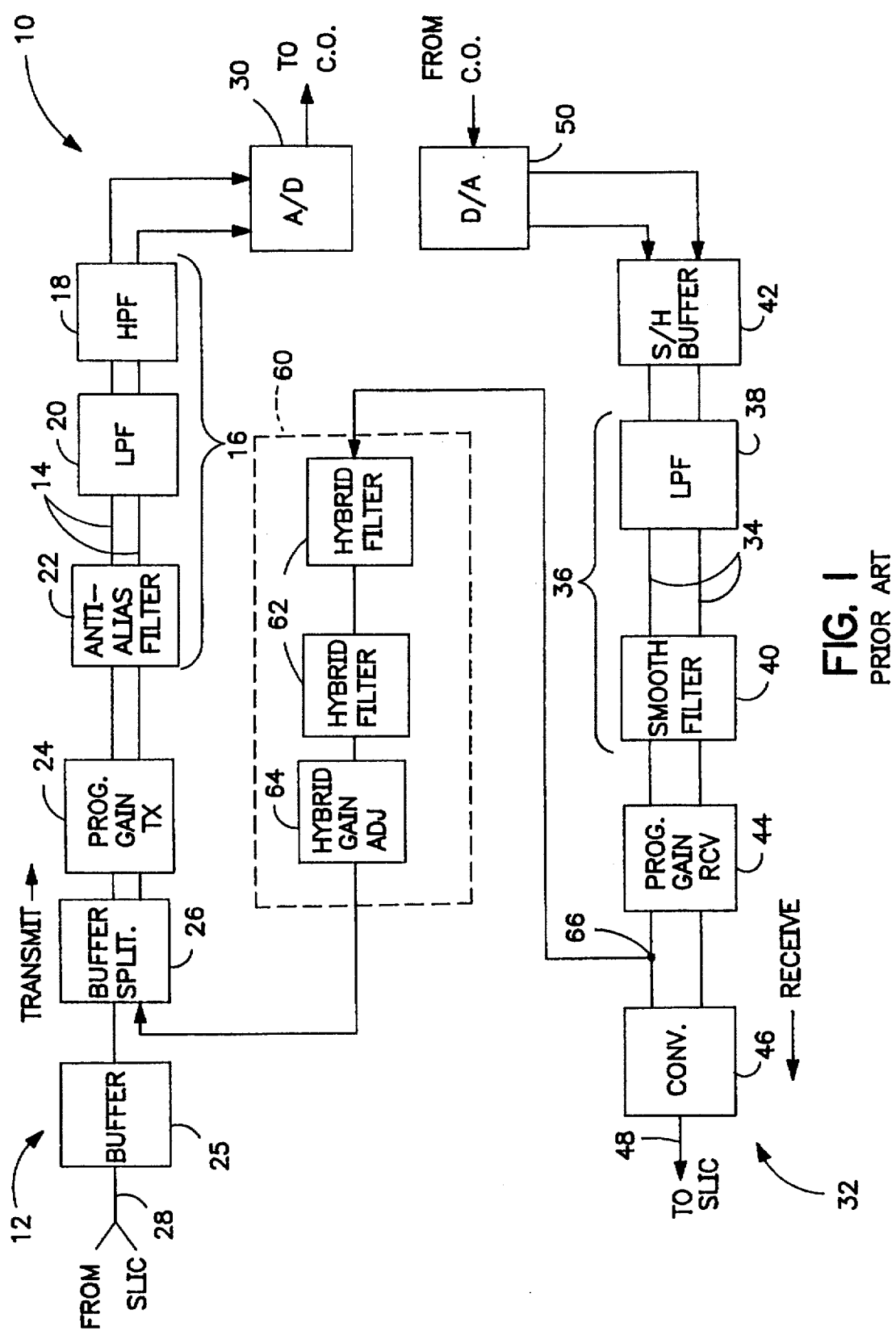
FIG. 1 is a circuit diagram of a CODEC of the prior art.
Figure 2:
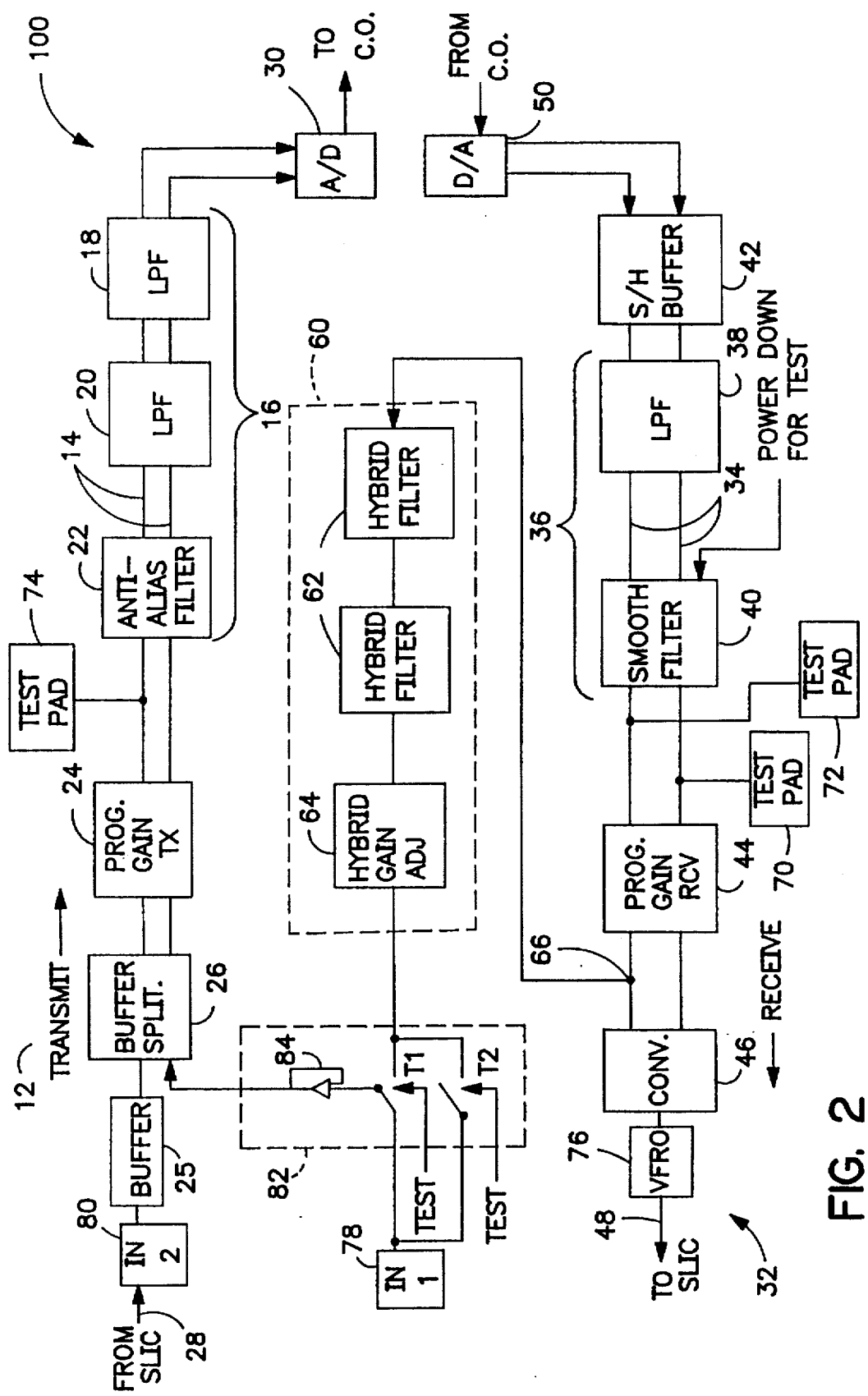
FIG. 2 is a circuit diagram of an embodiment of the present invention.

With reference now to FIG. 2 in which numerical designations from FIG. 1 have been retained on like components in the interest of clarity, an embodiment 100 of the present invention may include test pads 70, 72 and 74 for applying and sensing a test signal. Test pads 70, 72 and 74 are preferably positioned so as to avoid test signal contamination by transmit filters 16 and receive filters 36 and to include receive programmable gain section 44 and transmit programmable gain section 24 in the test signal path. In a preferred embodiment test pads 70 and 72 are each attached to a different one of receive lines 34 between receive filters 36 and receive programmable gain section 44. Test pad 74 may be attached to one of the transmit lines 14 between transmit filters 16 and transmit programmable gain section 24.

The test signal may be selectively applied to/sensed at test pads 70, 72 and 74 and other CODEC terminals to independently test (1) receive programmable gain section 44, (2) hybrid balance network 60 frequency response, (3) hybrid balance network 60 echo cancellation, and (4) transmit buffer 25, buffer splitter 26 and transmit programmable gain section 24.

A first test may test operation of receive programmable gain section 44. Power is preferably removed from smoothing filter 40 when performing the test. An appropriate AC test signal may be applied to test pads 70 and 72 and sensed at CODEC VFRO terminal 76 (a terminal typically present in CODECs) to thereby isolate and independently test receive programmable gain section 44.

A second test may test hybrid balance network 60 frequency response. Power is preferably removed from smoothing filter 40 when performing the test. A test signal, such as a differential flat frequency test signal, is applied to test pads 70 and 72, and switch T2 is closed. The test signal is routed through receive programmable gain section 44, through hybrid balance network 60 and sensed at CODEC input terminal 78 (a terminal typically present in CODECs), thereby avoiding passage of the test signal through receive filters 36 and transmit channel 12. The test signal sensed at terminal 78 indicates operation of hybrid balance network 60 by checking its frequency and phase response. If the first test above is conducted before the second test, proper operation of receive programmable gain section 44 will have been verified to remove a possible source of contamination for the second test.

A third test may test hybrid balance network 60 echo cancellation. Power is preferably removed from smoothing filter 40 when performing the test. A test signal, such as a differential flat frequency test signal, is applied to test pads 70 and 72, and switch T1 is set to connect hybrid balance network 60 to buffer splitter 26 (to the right in FIG. 2.) The test signal applied to test pads 70 and 72 will go through both the SLIC and through hybrid balance network 60. The test signal that goes through the SLIC will appear at CODEC input terminal 80 (a terminal typically present in CODECs) and will be combined with the test signal that has gone through hybrid balance network 60. The test signal may then be sensed at test pad 74 to test hybrid balance network 60 echo cancellation.

A fourth test may test operation of transmit buffer 25, buffer splitter 26 and transmit programmable gain section 24. Switch T1 may be set to isolate transmit channel 12 from hybrid balance network 60 (to the left in FIG. 2), and a test signal, such as an appropriate AC test signal, may be applied to terminal 80 and sensed at test pad 74 to thereby test transmit buffer 25, buffer splitter 26 and transmit programmable gain section 24.

Figure 3:
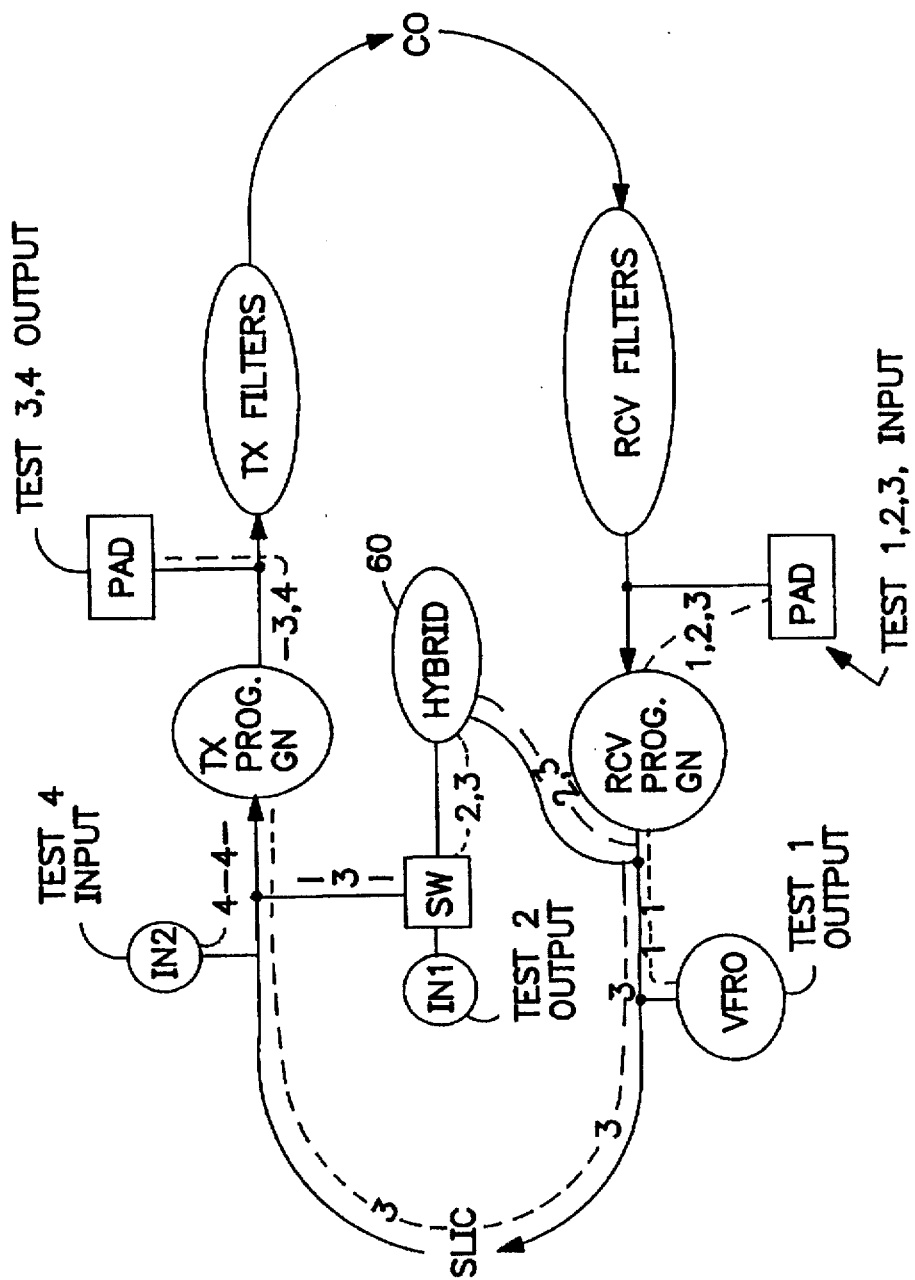
FIG. 3 is a schematic diagram illustrating test signal paths for four CODEC tests of the present invention.

The four test signal paths may be more clearly seen with reference to FIG. 3 in which some of the telephone system components have been omitted in the interest of clarity. Test signal paths for the four tests are shown in dashed lines interspersed with the numbers of the tests corresponding to tests one through four above. As is apparent, the transmit and receive filters are not in any of the test paths.

The input test signals may be changed as needed to vary test coverage, to test particular responses, or as needed to complete the tests. For example, gain settings of the programmable gain sections may be varied while the test signal is being applied to test the accuracy of the gain settings. Proper test signal outputs will be discerned by those of skill in the art. Tests other than the four tests described above may be designed which use the test pads and/or CODEC terminals to take advantage of the lack of test contamination by the transmit and receive filters.

A test module 82 may be provided which includes switches T1 and T2, circuitry (not shown) for removing power from smoothing filter 40, and a buffer 84.

In a preferred embodiment receive channel 12, transmit channel 32 and test module 82 are in a single integrated circuit chip. Test pads 70, 72 and 74 may be on a surface of the chip near an edge of the chip to facilitate contact with test equipment and avoid the need for micro-probing of the chip to apply a test signal. Terminals 76, 78 and 80 may be conventional CODEC terminals.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A method of testing a coder/decoder (CODEC) for a telephone system, the method comprising the steps of:
   (a) applying a test signal to a receive channel of the CODEC between receive filters and a receive programmable gain section;
   (b) receiving the applied test signal at one of (i) a test pad in the CODEC transmit channel between transmit filters and a transmit programmable gain section and (ii) a CODEC terminal to a subscriber line interface circuit (SLIC) or to a hybrid balance network connected between the transmit and receive channels; and
   (c) evaluating the received test signal to test CODEC operation,
   whereby the test signal avoids contamination from the transmit and receive filters.

2. The method of claim 1 wherein the test signal is received at the CODEC VFRO terminal connecting the receive channel to the SLIC, whereby the receive programmable gain section is tested.

3. The method of claim 2 wherein the test signal is an AC test signal.

4. The method of claim 1 wherein the test signal is received at the CODEC input terminal to the hybrid balance network, whereby a frequency response of the hybrid balance network is tested.

5. The method of claim 4 wherein the test signal is a differential flat frequency test signal.

6. The method of claim 1 wherein the test signal is received at the test pad in the transmit channel, whereby an echo cancellation of the hybrid balance network is tested.

7. The method of claim 6 wherein the test signal is a differential flat frequency test signal.

8. The method of claim 1 further comprising the steps of applying the test signal to a CODEC terminal connecting the receive channel to the SLIC, and
   receiving the applied test signal at the test pad in the transmit channel, whereby the transmit programmable gain section is tested.

9. The method of claim 8 wherein the test signal is an AC test signal.

10. The method of claim 1 further comprising the step of selecting with a switch located between the hybrid balance network and its connection to the transmit channel whether the applied test signal is to be received at (i) the test pad in the transmit channel or (ii) the CODEC terminal to the hybrid balance network.

11. The method of claim 1 wherein the receive filters include a smoothing filter and wherein the method further comprises the step of removing power from the smoothing filter when the test signal is applied.

12. A method of facilitating a test of a CODEC for a telephone system, the method comprising the steps of:
 (a) providing an input test pad which is connected to a receive channel of the CODEC between receive filters and a receive programmable gain section;
 (b) providing an output test pad which is connected to a transmit channel of the CODEC between transmit filters and a transmit programmable gain section; and
 (c) providing a switch for selecting whether a test signal from the input test pad and through a hybrid balance network is to be provided to the output test pad.

13. The method of claim 12 further comprising the steps of providing the transmit and receive channels of the CODEC in an integrated circuit, and providing the input and output test pads on a contactable surface of the integrated circuit to facilitate application of a test signal thereto.

14. The method of claim 12 wherein the switch is further for selecting whether the test signal is be provided to a CODEC terminal for the hybrid balance network.

15. A method of testing a hybrid balance network in a coder/decoder (CODEC) for a telephone system, the method comprising the steps of:
 (a) applying a test signal to a receive channel of the CODEC between receive filters and a receive programmable gain section;
 (b) selectively receiving the applied test signal at one of (i) a test pad in the CODEC transmit channel between transmit filters and a transmit programmable gain section and (ii) a CODEC terminal to the hybrid balance network,
 wherein reception of the test signal at the test pad is for testing the hybrid balance network echo cancellation and reception of the test signal at the CODEC terminal is for testing the hybrid balance network frequency response; and
 (c) evaluating the received test signal to test hybrid balance operation,
 whereby the test signal avoids contamination from the transmit and receive filters.

16. A method of testing a programmable gain section in a coder/decoder (CODEC) for a telephone system, the method comprising the steps of:
 (a) applying a test signal to one of (i) a first test pad in a receive channel of the CODEC between receive filters and a receive programmable gain section, and (ii) a CODEC input terminal connecting a transmit channel of the CODEC to a SLIC;
 (b) receiving the applied test signal at (i) a CODEC VFRO terminal when the test signal is applied to the first test pad, and (ii) a second test pad in the CODEC transmit channel between transmit filters and a transmit programmable gain section when the test signal is applied to the CODEC input terminal,
 wherein reception of the test signal at the VFRO terminal is for testing the receive programmable gain section and reception of the test signal at the second test pad is for testing the transmit programmable gain section; and
 (c) evaluating the received test signal to test programmable gain section operation,
 whereby the test signal avoids contamination from the transmit and receive filters.

17. A CODEC for a telephone system comprising:
 an input test pad connected to a receive channel of the CODEC between receive filters and a receive programmable gain section;
 an output test pad connected to a transmit channel of the CODEC between transmit filters and a transmit programmable gain section.

18. The CODEC of claim 17 further comprising a first switch for selecting whether a test signal from the input test pad and through a hybrid balance network is to be provided to the output test pad.

19. The CODEC of claim 18 further comprising a second switch for selecting whether a test signal from the input test pad and through a hybrid balance network is to be provided to a CODEC input terminal for the hybrid balance network.

20. The CODEC of claim 17 wherein the receive and transmit channels are in an integrated circuit, and wherein said input and output test pads are on a surface of the said integrated circuit adjacent an edge thereof which is selectively contactable from exterior to said integrated circuit.

21. The CODEC of claim 20 further comprising a switch for selecting whether a test signal from the input test pad is to be provided to the output test pad, said switch being integral with said integrated circuit.

22. The CODEC of claim 17 wherein the receive filters comprise a smoothing filter and wherein the CODEC further comprises means for removing power from the smoothing filter when the test signal is applied to said input test pad.

* * * * *